UNITED STATES PATENT OFFICE.

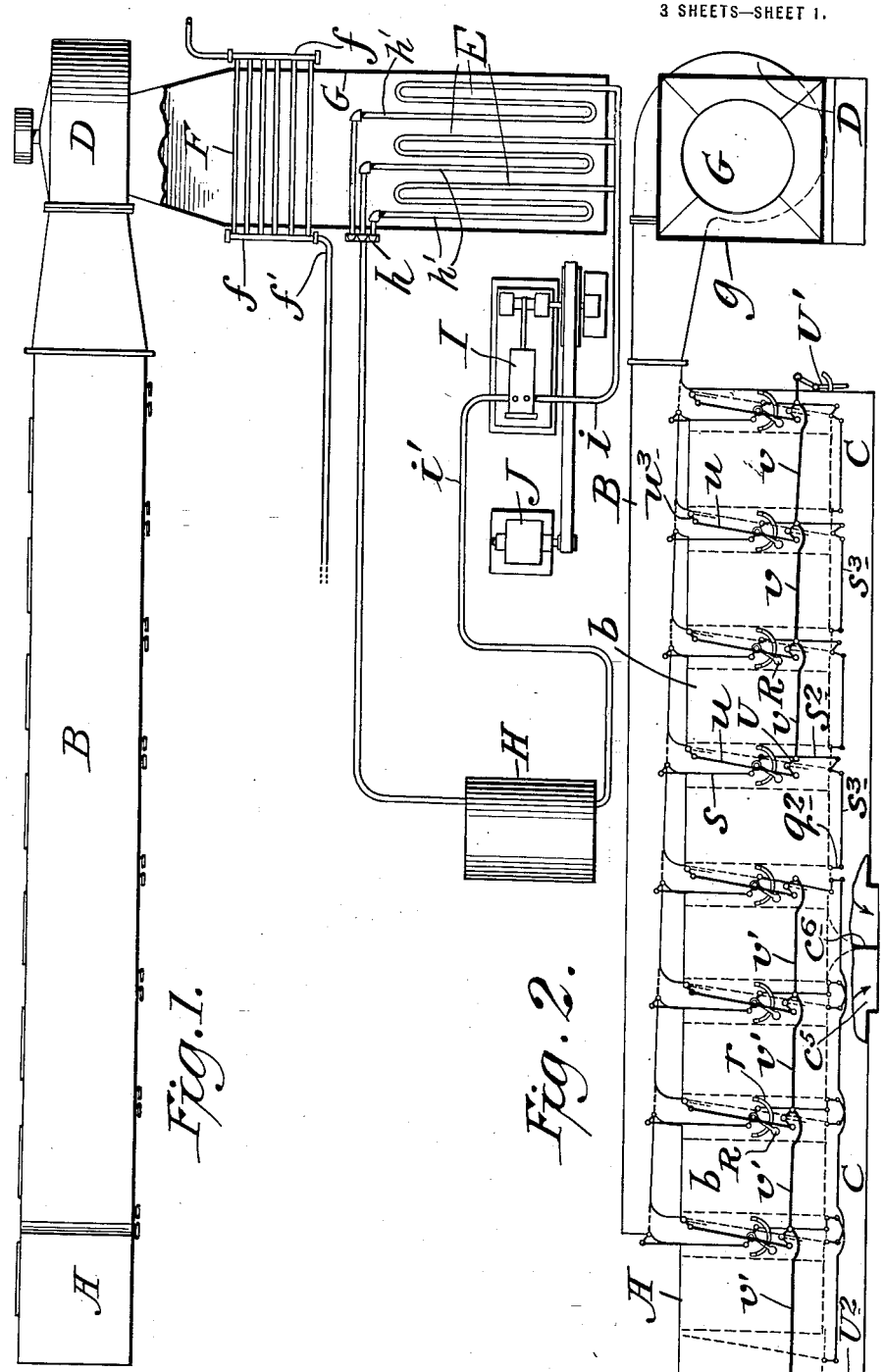

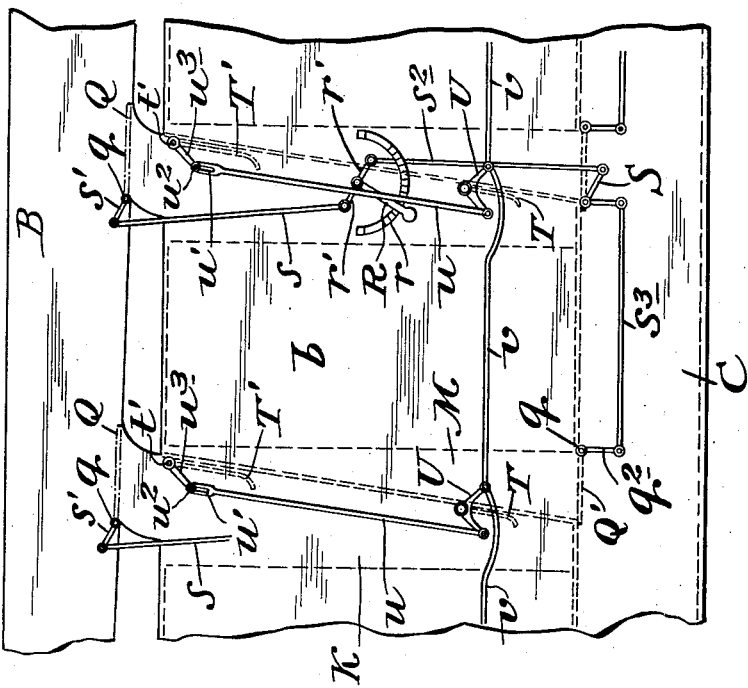

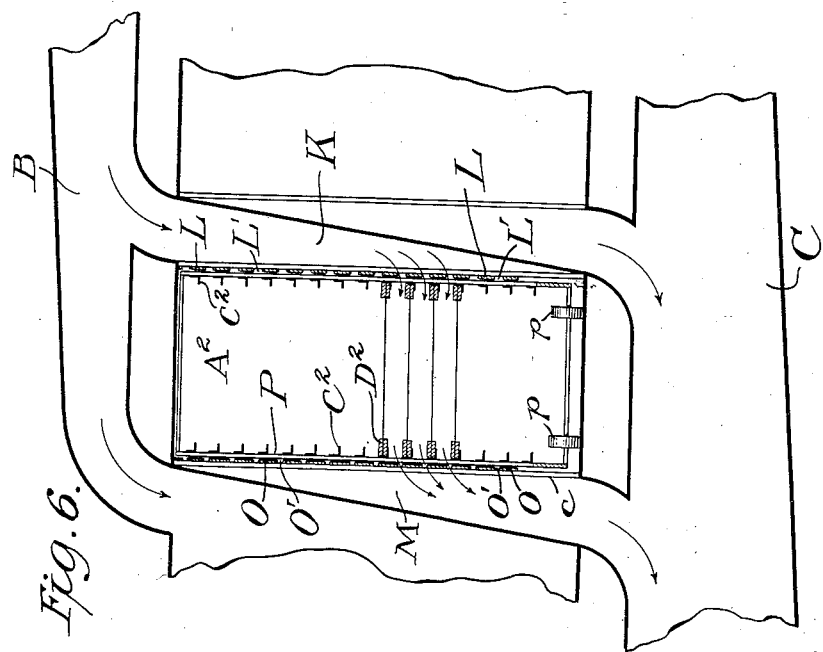
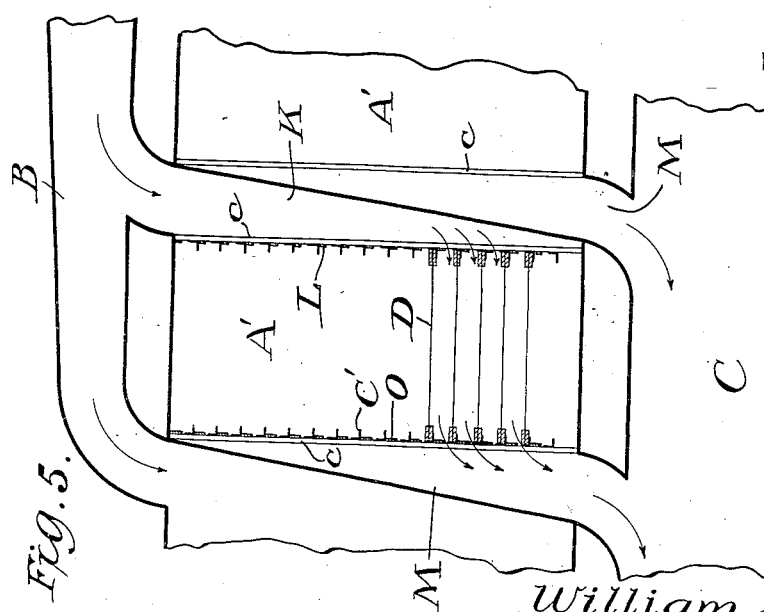
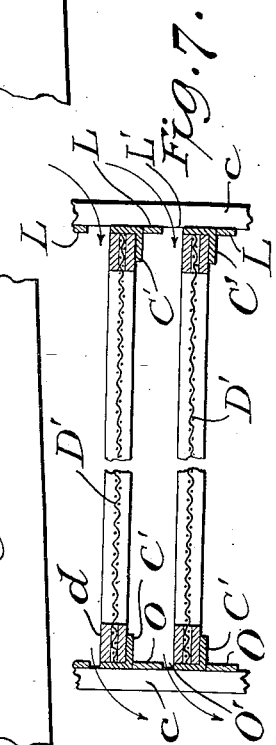

WILLIAM A. WOOD, OF DUNELLEN, NEW JERSEY, ASSIGNOR, BY MESNE ASSIGNMENTS, TO AIR UTILITIES COMPANY, OF NEW YORK, N. Y., A CORPORATION OF NEW YORK.

DEHYDRATING APPARATUS.

1,172,575.     Specification of Letters Patent.     Patented Feb. 22, 1916.

Application filed August 9, 1913. Serial No. 783,848.

*To all whom it may concern:*

Be it known that I, WILLIAM A. WOOD, a citizen of the United States, residing at Dunellen, county of Middlesex, and State of New Jersey, have invented a certain new and useful Dehydrating Apparatus, of which the following is a specification.

My invention consists in an apparatus for dehydrating various substances, and more particularly, bodies having a cellular structure.

The object of my invention is to improve the efficiency of dehydrating apparatus, by not only causing large bodies of dry air to pass in contact with the material to be dehydrated, but also by varying the level of the air currents at different times, thereby effecting more uniform absorption of moisture and drying.

The apparatus embodies means for conditioning the air prior to circulating it through the material treating chambers, whereby the air is deprived of the excess moisture carried by it and is subsequently heated to a higher temperature, the latter being dependent somewhat upon the nature of the substance to be treated.

According to this invention the air is dehydrated and warmed or heated to bring it to a certain condition wherein its avidity for absorbing moisture is brought to a maximum, and then the air is immediately conducted or blown into one or a series of material treating chambers, the operations of conditioning the air and dehydrating the material being continuous and carried on automatically. By conditioning the air and utilizing it in the manner described, the treatment of materials may be carried on economically and regardless of the humidity and temperature of the surrounding atmosphere, thus enabling the dehydration of materials to be effected at any season of the year and during rainy, moist, or dry weather.

In the practical form of apparatus, I employ a set of cooling or condensing coils, means for circulating a refrigerating agent through them and for effecting a subsequent recovery of such cooling agent in order to secure economy of operation, means for heating the air subsequent to cooling it in order to eliminate excess moisture therein, and means for establishing the circulation of air in large volumes and into contact with the cooling or condensing coils and with the heater, and for blowing such heated air, freed from excess moisture, into one or a series of material treating chambers. The air is supplied to said chamber or chambers by a trunk extending over the top thereof, the moisture-laden air making its exit from the bottom of the chamber or chambers through an outlet or exhaust trunk, as a result of which the air flows in a downward path, and across or over separated layers of the material. Means are provided for securing an equal distribution of air with respect to the trays or other supports which carry the material, and for controlling the flow of air so as to establish air pressure within the chambers, whereby the dehydrated and warmed air is brought into intimate contact with such material. Accordingly, the apparatus embodies a tapering inlet flue and a tapering outlet flue positioned at the respective sides of each material treating chamber; and in connection with said flues two series of baffles are employed for controlling the flow of air over the material and in such manner as to result in the establishment of a certain degree of air pressure within the chamber. The baffles at the outlet side of the chamber are somewhat wider than the baffles at the intake side of the chamber, thus producing air inlets of greater area than the air outlets, whereby the baffles at the outlet side of the chamber operate to check or retard the flow of air and thus to establish the pressure of air within the chamber.

It is found in practice that air blown through the tapering inlet trunk is not distributed uniformly by the descending flues through which the air flows into the material treating chambers. According to one part of this invention, certain dampers or influence plates are employed, two or more in each descending flue, for the purpose of directing the air into the material treating chambers at different levels, in order that the bottom, intermediate and top tiers of trays within each chamber may be supplied with fresh warmed dehydrated air for obtaining uniform results in the treatment of material at the bottom, middle and top of the chamber.

In the absence of the influence dampers, it is found in practice that the warm dehydrated air flows to the bottom of the descending flue, and thence through the lower tier of trays within the treating chamber, and that the air does not flow advantageously and in the required volume through the middle and top trays, as one result of which the material on the bottom trays will become treated more rapidly than the other trays above the same, and that the treatment of material on the middle and top trays will not be completed at the same time as that on the bottom trays. It is to overcome this practical defect that I have devised the influence dampers, a plurality of which are used in each descending flue. Said dampers are positioned one above the other, and they are associated with operating means by which they are moved successively to operative positions. Thus, at the beginning, all the influence dampers for each compartment occupy idle positions so that the air flows to the bottom of the descending flue in order to act upon the material of the lower tier of trays; after a certain time, the lower damper is raised for changing the course of the down-flowing air and deflecting the same across the middle tier of trays within the chamber, and thereafter the next upper damper is moved to an operative position for still further diverting the course of the down-flowing air so as to direct it into the upper tier of trays, whereby the flow of air is controllable in a manner to secure uniform results in the treatment of the layers of material occupying different levels within the chamber.

It should be stated that the operating means is of such form that all or a certain number of the lower dampers associated with the descending flues of a series of chambers will be moved simultaneously to their operative positions and without disturbing the upper dampers; and, further, that by a further adjustment of said operating means the upper dampers of all, or a certain number, of the flues of the series of chambers will, in like manner, be brought into their operative positions and without disturbing the lower dampers. The operating means is effective, also, in returning all the dampers, both upper and lower, to their normal or inoperative positions in order that said dampers may offer but little, if any, opposition to the flow of air through the descending flues. Provision is made, also, for cutting off the flow of air into either material treating chamber and for arresting the back flow of air into such chamber, at the lower part thereof and from the outlet trunk, whereby either chamber may be shut off to the exclusion of the other chambers which latter may remain in operation, and thus the chamber cut out of service temporarily may be opened without the hot air flowing therefrom into contact with the face and person of the attendant. To this end, two cut out dampers are employed in connection with each chamber, one of said dampers being positioned at the inlet between the intake trunk and the descending flue, whereas the other damper is positioned at the outlet from the exit flue to the outlet trunk. The two dampers are operatively connected by suitable means to a lever which by a single movement opens or closes the cut off dampers simultaneously. Thus, when it is desired to open a chamber prior to placing trays therein or removing trays therefrom, the operator simply moves the lever to one position so as to close the two dampers simultaneously, the effect of which is to cut off the flow of air from the inlet trunk to the intake flue and the chamber and, also, to arrest the back flow of air from the outlet trunk and the exit flue into the chamber; but, after the trays filled with fresh material shall have been deposited in the chamber, the lever should be again operated in order to open both dampers, so that the air flows from the inlet trunk, through the descending flue, the chamber, the exit flue, and thence to the exit trunk.

The material supporting means are, preferably, in the form of foraminous trays which are adapted to be inserted into, or withdrawn from, the chamber individually, although the trays for the chamber may be supported on a portable truck by which they may be introduced and withdrawn collectively.

In the accompanying drawings I have illustrated different practical embodiments of the invention, but the constructions shown therein are to be understood as illustrative, only, and not as defining the limits of the invention.

Figure 1 is a plan view of the apparatus, wherein the condensing coils, heating coils, and the mechanism for supplying the refrigerating agent to said condensing coils, are shown diagrammatically. Fig. 2 is an elevation of the apparatus illustrating the air supply trunk and the air exhaust trunk in connection with a series of material treating chambers. Fig. 3 is a side elevation on an enlarged scale of a part of the apparatus illustrating certain of the cut off dampers and the influence dampers in dotted lines and the operating means for said dampers. Fig. 4 is a vertical section of the apparatus shown in Fig. 3. Fig. 5 is a vertical cross section through a treating chamber embodying certain features of the invention, said view showing the flues, the material trays, and the baffles in coöperative relation to said chamber. Fig. 6 is a sectional diagrammatic view, illustrating another embodiment of the invention wherein a portable truck is employed for inserting the trays into, or withdrawing them from, the de-humidifying chamber at one operation. Fig. 7 is an enlarged detail view of two trays and the baffles associated therewith, in the form shown in Fig. 5.

A suitable casing A is provided with a series of material treating chambers A', access to which chambers is obtained through doors b. Obviously, any desired number of chambers A' may be employed.

B designates an air supply trunk, and C an air exhaust trunk, said trunks extending lengthwise of casing A and operatively connected with the chambers A' thereof, whereby air is adapted to be supplied simultaneously to all the chambers by trunk B and to be conveyed away from all the chambers by trunk C. The supply trunk B tapers in the direction of its length, but it is preferred to employ an exhaust trunk which is uniform in depth throughout the length thereof. Said exhaust trunk is shown as having a centrally positioned exit $c^5$ and a partition $c^6$ at said exit, whereby the air flows out of the right hand chambers and the left hand chambers through the exhaust trunk toward the centrally positioned exit thereof.

The required volume of air is blown through trunk B by the operation of a combined blower and exhauster D, the casing of which is suitably connected with one end portion of said trunk B. The air drawn into fan D is conditioned by depriving it of excess moisture and by heating the air to a suitable temperature, for which purpose I employ condensing coils E and heating coils F. Said condensing coils and heating coils are positioned within a dehumidifying chamber G, shown in Fig. 1 as extending in a direction at right angles to apparatus A and trunks B, C, although the relative position of said chamber G to casing A may be varied as found expedient. Said chamber G is provided with a funnel-shaped inlet g, the end of which is open for the free inflow of air, and within this inlet to the chamber are positioned the condensing coils so that the inflowing air will be brought into intimate contact with the surfaces of the coils for the purpose of condensing the excess moisture present in the air upon the cold surfaces of the coils.

Any suitable means may be employed for maintaining coils E at such a comparatively low temperature as will result in the condensation of the moisture from the air flowing into contact with said coils, but, in Fig. 1, I have shown, in a diagrammatic way, an ammonia refrigerating apparatus of a well known type. The refrigerating agent is stored in tank H, from which leads a pipe h to an expansion valve of a form well known in the art. From the expansion valve extends a series of branch pipes h' which collectively form the condensing coils E. The terminal ends of the pipes h' are connected to a return pipe i leading to a gas compressor I, the latter being operated from any suitable source, such as motor J. A return pipe i' connects the compressor with tank H. The refrigerating system operates in a well known way, for the reason that the ammonia passing through pipe h into the expansion valve is converted from a liquid into a gas by flowing through said expansion valve, the rapid expansion of the ammonia within the valve and the pipes h' tending to substantially decrease the temperature of the ammonia gas, which gas flows through coils E, pipe i, thence to compressor I, by the operation of which the ammonia gas is compressed into a liquid, adapted to be returned by pipe i' to tank H.

Heater F may be of any usual construction, but, as shown, it consists of coils connected with headers f having pipes f' by which steam is conveyed to and from the heater. Said heater F is positioned within chamber G and between blower D and condenser E. When the apparatus is in operation, the rotation of fan D draws air through inlet g of chamber G, and blows the air through wind trunk B. The inflowing air comes into contact with coils E, as a result of which, the excess moisture present in the air is condensed by contact with the surfaces of the coils, thus depositing moisture upon the coils E and substantially eliminating excess moisture from the air flowing through chamber G. The air flows directly from the condensing coils over, and into contact with, the heating coils, the latter operating to raise the air to a temperature suitable for the treatment of the material in chambers A'. This temperature may vary according to the nature of the material to be treated; in some instances, the temperature may be raised as high as 180° Fahrenheit, or the air may be heated to a temperature of 140° Fahrenheit, but for the treatment of many substances, the air is heated to a temperature between 110° and 180° Fahrenheit, say to 130° to 160° Fahrenheit. In the treatment of certain material or substances it may be desirable to employ dehydrated air at lower temperatures than those specified, or to use dehydrated air in the absence of heat; accordingly, the supply of steam may be cut off from heater F, or the steam supply may be regulated so that the heater will raise the temperature of the air only slightly.

Suitable means are provided for supporting the material within chambers A', and, in Figs. 5, 6 and 7, there are shown two forms of supporting devices, Figs. 5 and 7 illustrating permanent means for supporting the trays within chamber A', whereas Fig. 6 illustrates a portable truck whereby the trays may be collectively introduced into, or withdrawn from, the chamber. In the construction of Figs. 5 and 7, each chamber A' is provided with rows of stanchions c at the respective sides thereof, and to these stanchions are secured rows of angle irons C', upon the horizontal flanges of which are adapted to rest the frames d of trays D', the latter being composed of wire gauze or other foraminous material. The trays are insertible individually into chamber A' and withdrawable in like manner therefrom. Obviously, the door b should be opened to permit access to the chamber, whereupon the trays containing the treated material may be withdrawn from said chamber, and the trays loaded with untreated material may be introduced into the chamber, said trays sliding lengthwise upon the inwardly extending flanges of the angle irons.

Means are provided for supplying air to all the trays contained within the treating chamber, and for conducting the moisture laden air rapidly from said chamber. From the supply trunk B extends a flue K, positioned on one side of chamber A', which flue tapers downwardly in the direction of the depth of the treating chamber, said flue operating to convey air from trunk B and to supply air to chamber A' over the trays. For this purpose, a series of baffles L are provided at the intake side of chamber A', each baffle L being attached to stanchions c directly below the angle irons C' of one tray and above the angle irons of the next tray, as shown more clearly in Fig. 7. The baffle L is spaced with respect to the angle iron so as to produce an opening L' of definite area, and through this opening the air supplied by flue K is adapted to flow over the tray and into contact with the material thereon.

An exit flue M is positioned at the outlet side of chamber A', said flue tapering in a reverse direction to the taper of flue K, that is to say, whereas flue K decreases in size from its top toward the bottom, flue M increases in size from the top toward the bottom, thus providing for the free flow of air from flue M into the exhaust trunk C, said flue M having free communication with the exhaust trunk. At the outlet side of chamber A' is positioned a series of baffles O. Each baffle O is secured to stanchions c and is positioned below angle iron C', said baffle O being in coöperative relation to tray D' just below it. The baffle O is spaced relative to the angle iron and the tray so as to produce an outlet opening O' of definite area.

According to this invention, the flow of air through chamber A' and over the material resting upon trays D' is checked, so that there will result a pressure of air within the chamber, said air pressure being substantially from ½ ounce to 1 ounce per square inch, whereby the air circulating through the chamber will be brought into intimate contact with the material resting upon the trays, notwithstanding the air may flow continuously into and out of the chamber. This result is in part brought about by the difference in the relative areas of the inlets L' to the outlets O', and to secure this difference, the baffles O are considerably wider than the baffles L, whereby the area of each outlet O' is considerably smaller than that of the corresponding inlet L'. As will be seen by reference to Fig. 7, baffle O is wider than baffle L, and, accordingly, outlet O' is of less area than inlet L', whereby the required volume of air is admitted by the inlet, such air flowing into contact with the baffle O which coöperates with outlet O' in impeding or retarding the outflow of air from the chamber. By establishing the pressure in the chamber and by directing the air to circulate from the top toward the bottom of the chamber, I am enabled to secure very great efficiency in dehydrating substances within said chamber A'. Before admitting the air to the chamber, it is conditioned as described to increase its avidity for moisture to the maximum, by condensing the excess moisture from the air and heating said air to a desired temperature. Said conditioned air is supplied in large volume to, and distributed uniformly through, the chamber, and the flow of air through the chamber is retarded or restricted to a certain extent with a view to establishing pressure within the chamber for bringing the conditioned air into direct, intimate contact with the material, the whole operation effecting the rapid dehydration of the material without breaking down or changing the cell structure of such material.

Instead of supporting the trays individually within the treating chamber, I may employ a portable wheeled truck, shown in Fig. 6. Truck P is a skeleton frame supported on carrying wheels p and provided at the side portions thereof with angle irons $C^2$, upon which are adapted to rest the trays $D^2$. The truck carrying a series of loaded trays is adapted to slide within treating chamber $A^2$ and between the baffles L, O. The baffles are secured to stanchions c in such a manner as to produce inlets L' and outlets O', the latter being of less area than the inlets. The truck and the trays slide into position between the baffles, and the two series of baffles are arranged in such relation to the trays that inlets L' and outlets O' will lie above the trays for directing the circulation of air through the chamber and the truck in a manner to bring the air into contact with the material on the trays. Obviously, the truck containing the loaded trays can be easily withdrawn from the chamber, and a truck with freshly loaded trays run into position within the chamber whereby one series of trays may be removed collectively from the chamber and another series of loaded trays may be collectively introduced into the chamber.

The communication of the descending inlet flue K with the supply trunk B is controlled by a damper Q, and the communication between the exit flue M with the outlet trunk C is adapted to be cut off by another damper Q', each damper being shown as a substantially flat plate carried by a rock shaft $q$ extending horizontally across the apparatus and protruding at one end therefrom. Dampers Q and Q' are movable from the horizontal position shown in full lines in Fig. 4, and in dotted lines in Fig. 3, to the inclined position shown by dotted lines in Fig. 4, whereby the dampers when in the inclined position are opened so as to permit air to flow from trunk B into flue K, the damper Q when opened intercepting some of the air flowing through trunk B and deflecting the same through flue K. Damper Q' is positioned at the point of communication from the descending flue M with exit trunk C, and when said damper occupies the inclined position shown in dotted lines in Fig. 4, the air circulating through treating chamber A passes freely through flue M into trunk C; but when said damper Q' is turned to the horizontal position shown in full lines in Fig. 4, and dotted lines in Fig. 3, then the communication of flue M with trunk C is cut off so as to prevent a back flow of air from trunk C through flue M into the chamber A when the door to the latter is opened.

In Fig. 3 I have shown one form of operating means for imparting movement simultaneously to the cut-off dampers Q Q'. Said operating means consists of a lever R adapted to traverse a segment $r$ fixed to the outside of the machine. This lever R is provided with two arms $r'$, to one of which is connected a rod $s$ extending upwardly to a crank $s'$ on the rockshaft $q$ of upper damper Q. To the other arm $r'$ of lever R is connected a rod $s^2$ which is connected with a crank arm $q^2$ on the rockshaft $q$ of the lower damper Q'. It will be seen that the lever R may be moved in one direction for the purpose of imparting movement to rods $s$ $s^2$ $s^3$ so as to open dampers Q Q' simultaneously, the extent of the opening being controllable at will, but by moving said lever R in an opposite direction the rods will be operated to simultaneously close the two dampers, thus cutting off the inflow of air to chamber A and the back flow of air from the exit trunk C through flue M. The dampers Q Q' for each compartment are operated independently from separate controlling levers, and thus the circulation of air through one compartment may be cut off independently of the flow of air through other compartments so that the compartment thus cut out of service may be emptied and refilled without interrupting the operation of dehydration in the remaining compartments of the apparatus.

In addition to the cut out dampers Q Q' just described, other dampers, termed by me influence dampers, are employed within the descending flue K associated with each treating chamber, whereby the influence dampers are adapted to direct the inflowing air into contact with the material on the middle and upper tiers of trays within said treating chamber. The influence dampers are indicated at T T', the former T being positioned at a suitable distance above the lower end of flue K, whereas the damper T' is positioned near the top part of flue K. Each damper consists of a substantially flat plate curved at the free end thereof, as at $t$, and said dampers are hung on horizontal rods $t'$ extending transversely across the flue. The rod of damper T is provided at one end with a bellcrank U, to one arm of which is pivoted an upwardly extending rod $u$, the upper end of which is slotted at $u'$ and is connected by a pin $u^2$ to a crank arm $u^3$ rigidly attached to the rockshaft $t'$ of the upper influence damper T'. At the respective ends of the apparatus are provided operating levers U' U², from which levers extend rods $v$ $v'$. The rods $v$ from lever U' are connected with the bellcranks U of a certain number of the lower influence dampers T, whereas the rod $v'$ extends from the other operating lever U² so as to connect with the bellcranks U of another series of these lower influence dampers T. The levers U' U² thus operate the influence dampers of the right and left hand chambers of apparatus A, and each lever is adapted to simultaneously operate first the lower influence dampers T and thereafter the upper influence dampers T' of a certain number of the chambers.

When the apparatus is in use the dampers Q Q' are opened and the influence dampers T T' are lowered to the full line positions of Fig. 4, thus permitting the air to flow from trunk B through flues K into the chambers A, thence through flues M and into the wind trunk C. At the first period of operation the air flowing downwardly through the flues K will enter the lower parts of chambers A so as to treat the material on the lower tiers of trays within said chambers, but after a certain length of time levers U' U² are moved to certain positions, whereupon the rods $v$ $v'$ act on the bell cranks U so as to turn the lower dampers T to the dotted line positions of Fig. 4, at which time the upper slotted ends of rods $u$ slide idly over the pins $u^2$ on the cranks $u^3$ of influence dampers T'. As a result of this operation all the lower influence dampers T are moved within the flues K so as to intercept the air flowing downwardly through said flues K, the air rebounding from said dampers T and flowing into chambers A so as to treat the material on the middle tiers of trays, dampers T' being inactive. At the proper time the operator moves the levers U' U² to further positions, thereby turning the cranks U and causing the rods $u$ to lift the pins $u'$ and cranks $u^3$ so as to raise the upper influence dampers to the dotted line position of Fig. 4, as a result of which the upper dampers T' intercept to a large extent the downward flow of air through flues K so that the air will be deflected through the upper parts of chambers A' for the purpose of treating the material on the upper tiers of trays therein.

It is to be noted that the dampers T of a certain number of chambers are operated simultaneously by the movement of one lever, and at a subsequent period the movement of this lever will simultaneously operate the other dampers T' so that the air will be directed into the middle and upper portions of the chambers. The same operation of the influence dampers takes place by the movement of the other lever, all the dampers associated with one series of chambers being operated simultaneously and the two series of dampers T T' being moved successively to their effective positions.

The blower and suction fan is positioned between the treating chambers and the dehumidifying chamber G which contains the condensing coils and the heaters. Obviously, the air will be drawn into contact with the condensers and the heaters for the purpose of dehydrating the air and warming it to a desired temperature, say from 100° Fahrenheit to 180° Fahrenheit, and subsequent to this dehydrating and warming of the air, the fan beats or acts on the air by churning it and blows it into chambers A', the churning action of the fan tending to intimately mix the colder and warm stratas of air, the operation being continuous and automatic.

Having thus fully described the invention, what I claim as new and desire to secure by Letters Patent is:—

1. In a dehydrating apparatus, the combination of a plurality of material treating chambers, an air supply trunk, an air exhaust trunk, means for feeding air to the air supply trunk, and means whereby the air fed to the treating chambers may be caused to pass through each of said chambers at different levels.

2. In a dehydrating apparatus, the combination of a plurality of material treating chambers, an air supply trunk, an air exhaust trunk, means for feeding air to the air supply trunk and through said chambers, a series of dampers for directing the air into each of the material treating chambers at different levels, and means for simultaneously moving the dampers.

3. In a dehydrating apparatus, the combination of a plurality of material treating chambers, an air supply trunk, an air exhaust trunk, flues situated on opposite sides of the material treating chambers, one of said flues connected to the supply trunk and the other of said flues connected to the exhaust trunk, together with a plurality of dampers in the first named flue for directing the air into the material treating chambers at different levels.

4. In a dehydrating apparatus, the combination of a plurality of material treating chambers, an air supply trunk, an air exhaust trunk, flues situated on opposite sides of the material treating chambers, one of said flues connected to the supply trunk and the other of said flues connected to the exhaust trunk, dampers in the first named flues for directing the air into the material treating chambers at different levels, together with means for simultaneously moving said dampers.

5. In a dehydrating apparatus, the combination of a plurality of material treating chambers, an air supply trunk, an air exhaust trunk, flues situated on opposite sides of the material treating chambers, one of said flues connected to the supply trunk and the other of said flues connected to the exhaust trunk, valves in said flues, one of said valves controlling the entrance from the supply trunk and the other the entrance from the flue into the exhaust trunk, together with means for simultaneously actuating said valves.

6. In a dehydrating apparatus, the combination of a plurality of material treating chambers, an air supply trunk, an air exhaust trunk, flues situated on opposite sides of the material treating chambers, one of said flues connected to the supply trunk and the other of said flues connected to the exhaust trunk, valves in said flues, one of said valves controlling the entrance from the supply trunk and the other the entrance from the flue into the exhaust trunk, together with means for actuating said valves, a plurality of dampers in one of said flues, together with means for simultaneously changing the position of said dampers.

7. In a dehydrating apparatus, the combination of a plurality of material treating chambers, an air supply trunk, an air exhaust trunk, flues situated on opposite sides of the material treating chambers, one of said flues having its greatest diameter at its point of connection with the air supply trunk, and the other of said flues having its greatest diameter at its point of connection with the air exhaust trunk, together with a series of valves adapted to divert the passage of the air through each of said chambers at different levels.

8. In a dehydrating apparatus, the combination of a plurality of material treating chambers, an air supply trunk situated over said chambers, an air exhaust trunk situated under said chambers, means for controlling the passage of air from the supply trunk through the chambers to the exhaust trunk, and means for directing the passage of air through the treating chambers at different levels.

9. In a dehydrating apparatus, the combination of a plurality of material treating chambers, an air supply trunk, an air exhaust trunk, flues situated on opposite sides of the material treating chambers, together with means whereby at one time the air currents will flow through the whole of the treating chambers and at other times through only a part of the treating chambers.

10. In a dehydrating apparatus, the combination of a plurality of material treating chambers, an air supply trunk, an air exhaust trunk, flues situated on opposite sides of the material treating chambers, one of said flues connected to the air supply trunk and greater in diameter than the other of said flues connected to the air exhaust trunk, whereby the passage of the air through the material treating chambers will be retarded, together with means for directing the air through the material treating chambers at different levels.

11. In a dehydrating apparatus, the combination of means for dehydrating air, means for projecting air, an air supply trunk connected to the projecting means, a plurality of material treating chambers, an air exhaust trunk, together with means for directing the air into the material treating chambers at different levels.

12. In a dehydrating apparatus, the combination with a treating chamber, a supply trunk, and a flue, of a plurality of influence dampers positioned within said flue, together with means for altering the operative position of the dampers, whereby the flow of air through each of said chambers will be at different levels.

13. In a dehydrating apparatus, the combination with a treating chamber and a flue for supplying air thereto, of a plurality of dampers positioned within the flue, one above the other, together with means whereby through one movement the lower damper is brought into position and thereafter the upper damper into position, and by opposite movement the upper damper into position and thereafter the lower damper.

14. In a dehydrating apparatus, the combination of a treating chamber, a supply trunk, an air exhaust trunk, a flue leading from the supply trunk to the exhaust trunk, a plurality of influence dampers positioned within said flue, together with means for altering the operative position of the dampers, whereby the horizontal plane traversed by the flow of air through each of said chambers will at different times be at different levels.

In testimony whereof I have signed my name to this specification in the presence of two subscribing witnesses.

WILLIAM A. WOOD.

Witnesses:
H. I. BERNHARD,
M. C. RODRIGUEZ.